United States Patent [19]

Bores

[11] Patent Number: 5,741,086
[45] Date of Patent: Apr. 21, 1998

[54] INTEGRATED, MULTIPHASE, ENERGY-DISSIPATING ENVIRONMENTAL SYSTEM

[76] Inventor: Pedro Suarez Bores, Vegafria. 1-T 1. 28035. Madrid. Spain

[21] Appl. No.: 72,159

[22] Filed: Jun. 4, 1993

[30] Foreign Application Priority Data

Jun. 10, 1992 [ES] Spain ................... 9201211

[51] Int. Cl.$^6$ .................................... E02B 3/06
[52] U.S. Cl. ................. 405/30; 405/21; 405/31; 405/34
[58] Field of Search ................. 405/29, 30, 31, 405/21, 32–35, 16, 17, 19

[56] References Cited

U.S. PATENT DOCUMENTS

| 320,129 | 6/1885 | Goodridge | 405/34 |
|---|---|---|---|
| 1,137,049 | 4/1915 | Callahan | 405/34 |
| 1,175,962 | 3/1916 | Lathan | 405/31 |
| 1,880,838 | 10/1932 | Curney | 405/32 |
| 2,000,311 | 5/1935 | Wood et al. | 405/33 |
| 2,920,454 | 1/1960 | Wolf | 405/32 |
| 3,118,282 | 1/1964 | Jarlan | 405/31 |
| 3,368,357 | 2/1968 | Takamori | 405/29 |
| 3,921,408 | 11/1975 | Lamy | 405/31 |
| 4,279,536 | 7/1981 | Jarlan | 405/31 |
| 4,801,220 | 1/1989 | Bores | |
| 4,818,141 | 4/1989 | Rauch | 405/30 |
| 4,834,578 | 5/1989 | Bores | 405/30 |
| 4,875,804 | 10/1989 | Bores | |
| 5,246,307 | 9/1993 | Rauch | 405/30 X |

FOREIGN PATENT DOCUMENTS

| 537141 | 5/1985 | Spain . |
|---|---|---|
| 295248 | 10/1988 | Spain . |
| 295249 | 10/1988 | Spain . |
| 9102080 | 3/1994 | Spain . |

*Primary Examiner*—Dennis L. Taylor
*Attorney, Agent, or Firm*—Amster, Rothstein & Ebenstein

[57] ABSTRACT

This patent consists of an INTEGRATED, MULTIPHASE, ENERGY-DISSIPATING ENVIRONMENTAL SYSTEM, applicable in forming sheltered port and coastal areas. Its channels and basins act as an integrated, hydrodynamic, energy-dissipating unit as their boundaries are formed by linear, low crown level structuring elements, preferably nonreflecting, overflowable, preferably formed by overflowable rubblemound breakwaters and/or permeable quays, if necessary with these elements discontinuous, dissipating short period gravity waves, their reflection and possible resonances and allowing overflow waters and coastal currents to circulate.

Because of its low crown level and the specificities characterizing its structuring elements, this System preserves sea views and allows surface air to freely circulate and basin water to be renewed., with consequent functional, environmental and scenic advantages. (FIG. 3).

5 Claims, 11 Drawing Sheets

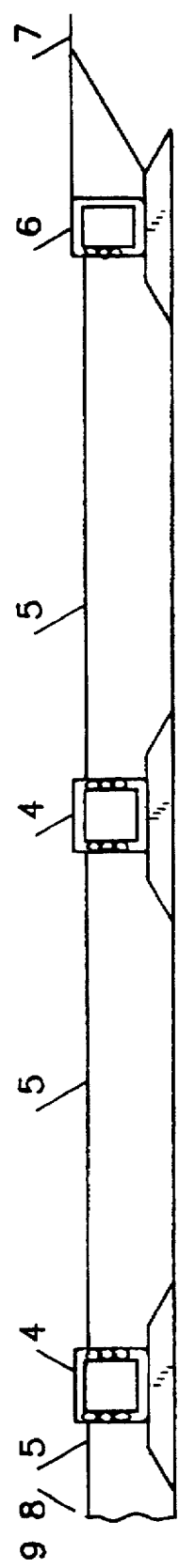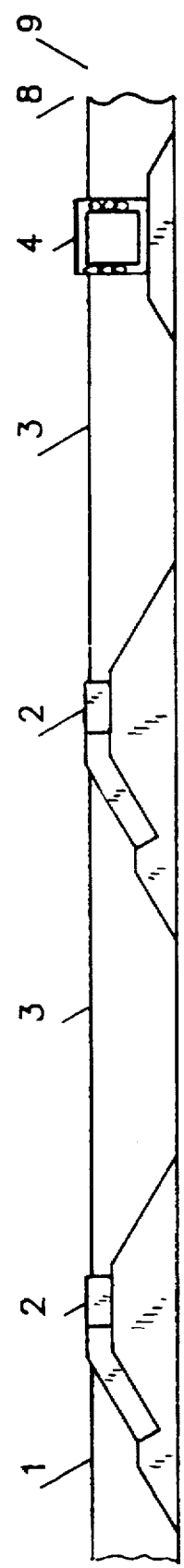

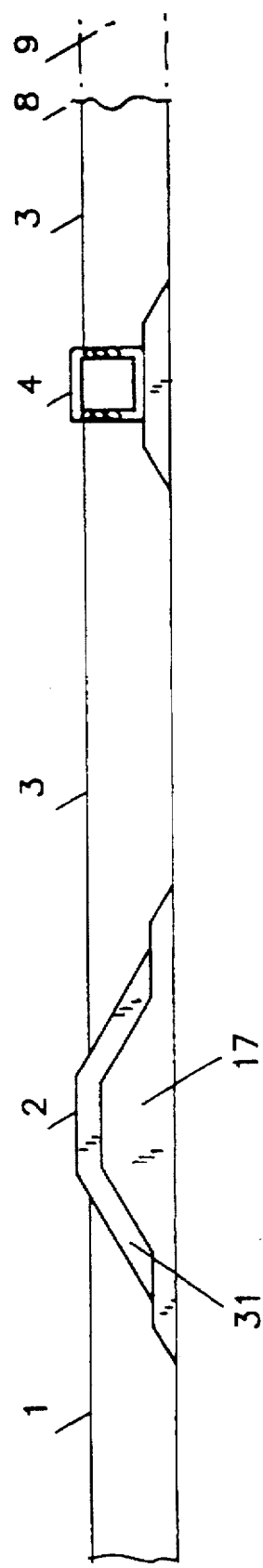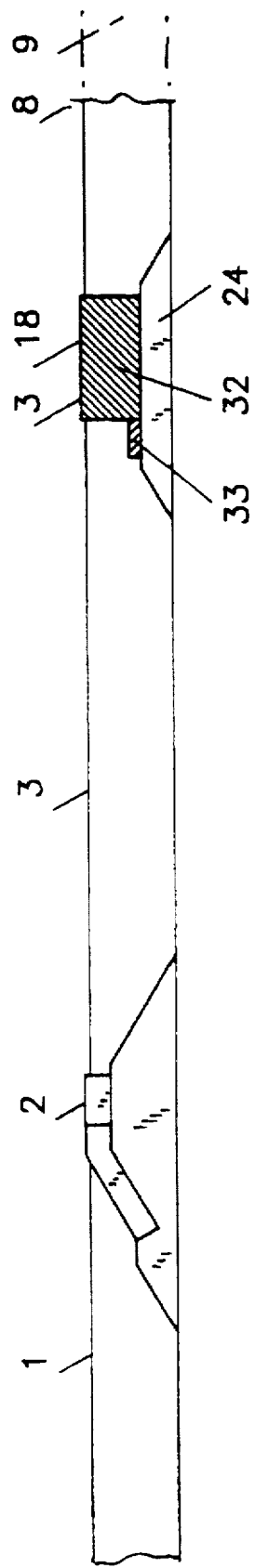

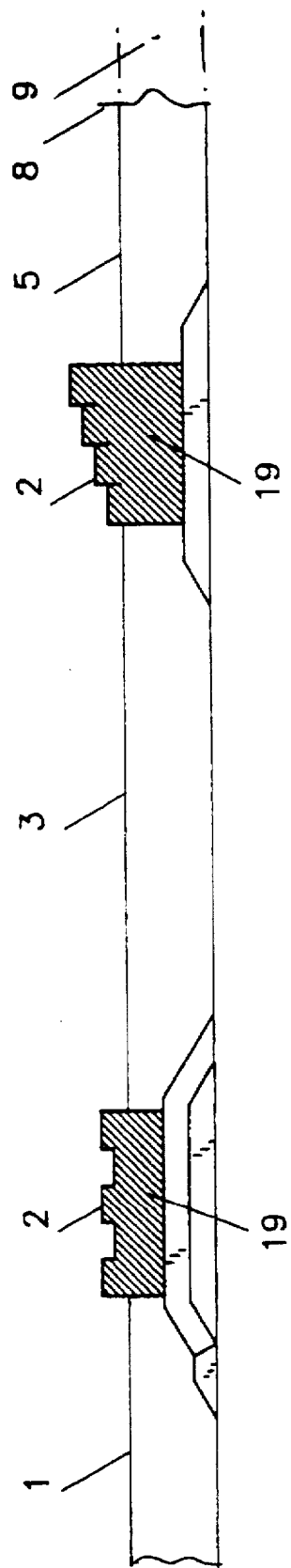
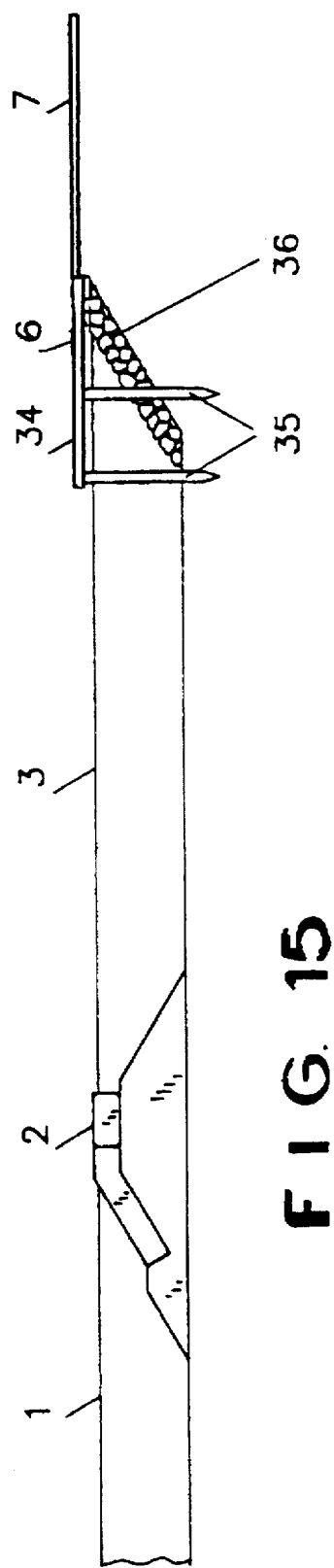
FIG. 14
FIG. 15

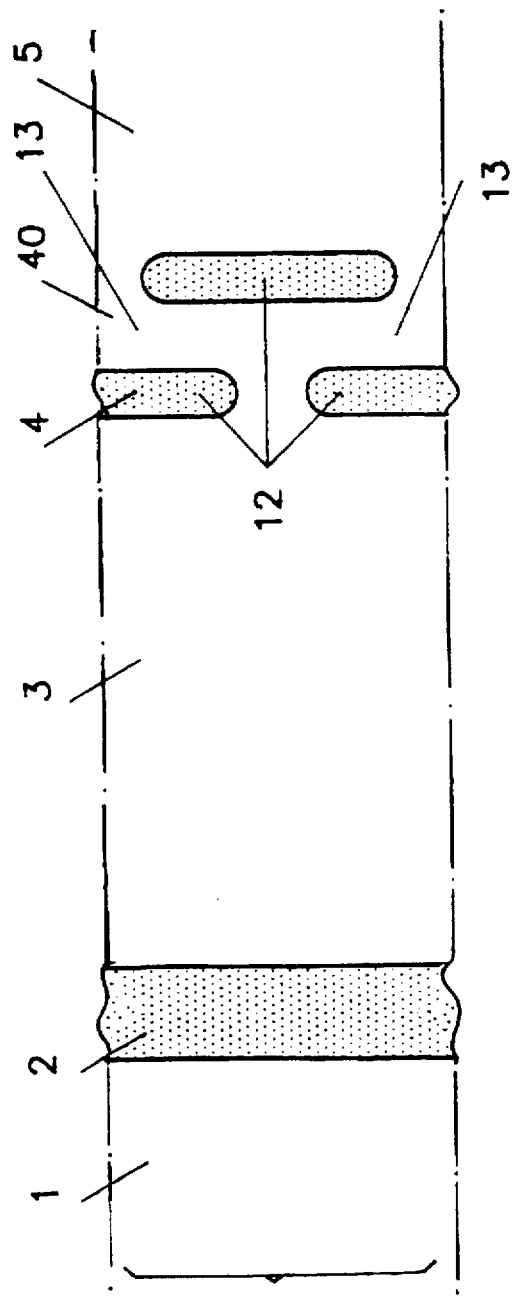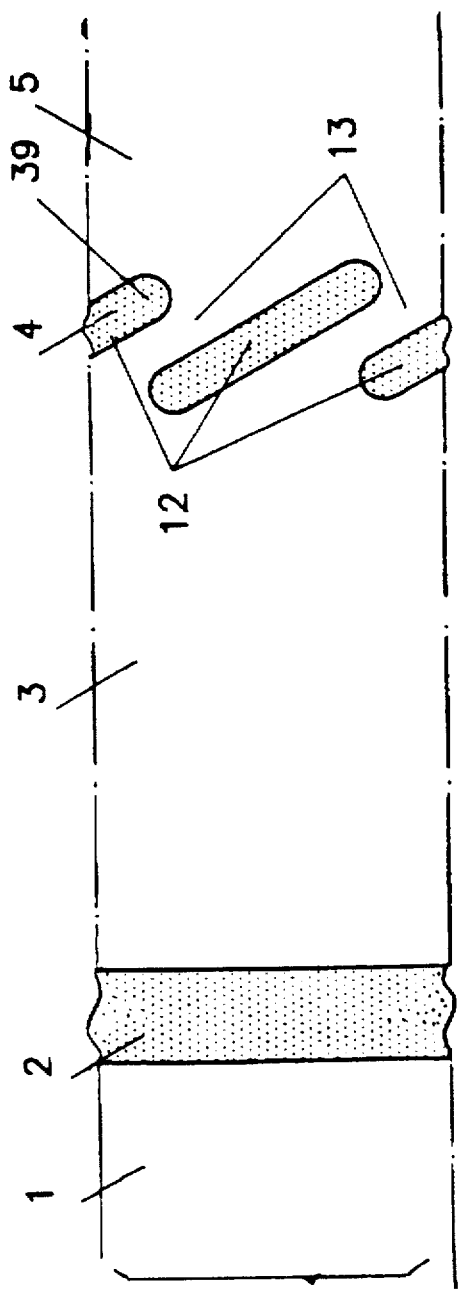

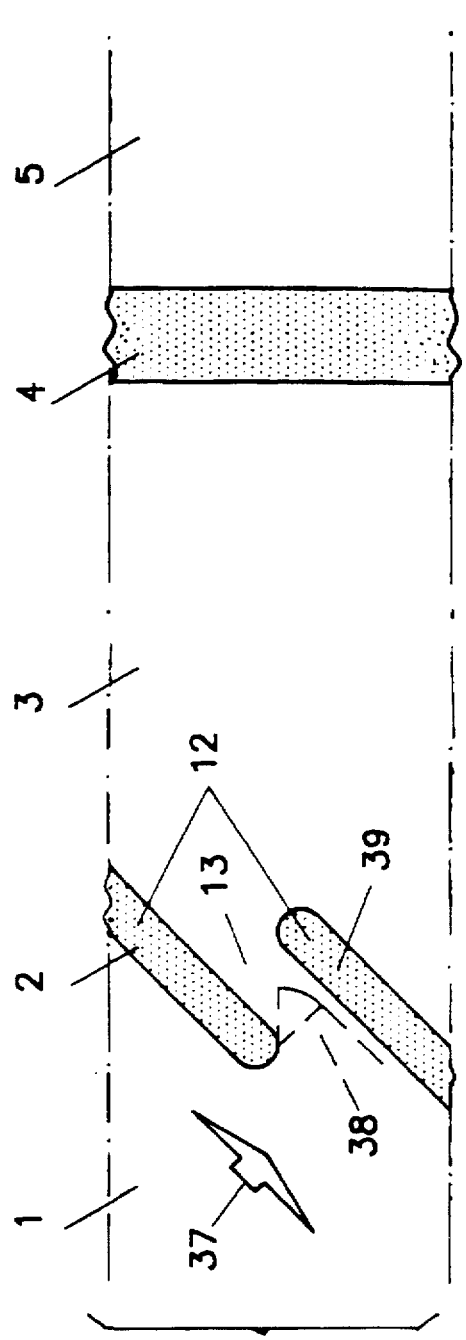
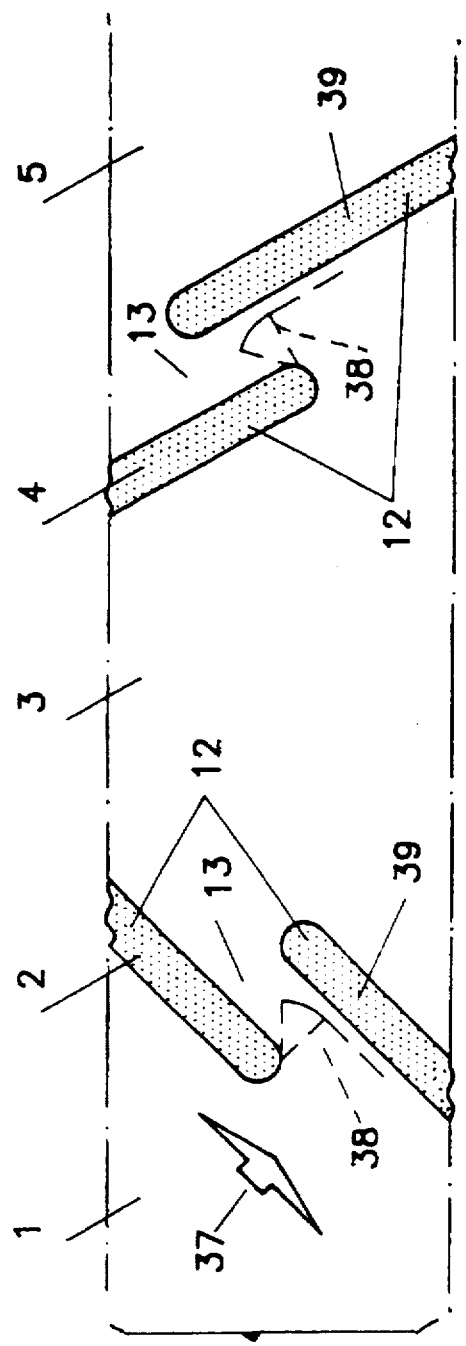

5,741,086

INTEGRATED, MULTIPHASE, ENERGY-DISSIPATING ENVIRONMENTAL SYSTEM

BACKGROUND OF THE INVENTION

The subject of this patent of invention is an INTEGRATED, MULTIPHASE, ENERGY-DISSIPATING ENVIRONMENTAL SYSTEM for the protection of ports, harbours and coastal complexes. The structural elements which conform the SYSTEM are sequential, in series, and work together to prevent the wave energy from invading the protected waterspace. The combination of overflowable breakwaters, permeable quays and nonreflecting structures separated by channels or basins behaves as an integrated, hydrodynamic, energy-dissipating unit. The system works as follows: first, as the waves (wind waves) pass over the overflowable structure the watermass is broken and dispersed loosing its dynamic energy through the energy-dissipating devices placed on it's crown. As the water emultion hits the channel the choppiness created is mitigated by the channel (hydraulic dissipator) and finally annuled by the permeable quay as the water flows through. Any other residual agitation that might be created inside the port or harbour is significantly reduced by the nonreflecting perimetral structure. The SYSTEM dissipates the energy of the short-period gravity waves (wind waves, wake waves, percution waves) and prevents resonances and wave reflection inside the harbour, while enabeling:

the sea horizon to be observed the stagnated and polluted waters inside the harbour to be renewd and the surface air and sea breezes to circulate freely in the sheltered area as well as allowing for the structural elements and channel areas to be occupied and enjoyed, during the benevolent weather seasons, by the users who can fullfil such activities as fishing, swimming or boating.

For at least three thousand years, man has been creating artifical, sheltered areas on coasts, mainly for the purpose of building ports, using mainly shelter breakwaters and mooring quays as structures with both frequently combined into breakwater-quays.

Surprisingly, unlike what has happened in other tecniques, the type of these maritime structures, conventional breakwaters and quays, has not substantially evolved over time and, in general, at least when wave energy is very high, have kept to the types consolidated already in times prior to the Roman Empire.

Up to the present time, while maintaining this very old tradition, these marine structures have been designed to strictly fulfill the main function for which they were intended—vessel berthing and mooring—. Over the last few decades, these structures have been designed with sophisticated studies and structural tests to determine the dynamic action of gravity waves, berthing and/or mooring stresses, seismic effects, etc., but hardly stopping to observe and much less endeavour to solve the serious functional, environmental and panoramic problems caused by these structures. Such problems are particularly marked on coasts with a short tidal range.

Conventional types of shelter structure have been classed into two large groups:

vertical or quasi vertical face breakwaters forming monolithic structures called vertical or reflecting breakwaters, and sloping breakwaters generally built with natural or artificial blocks, regularly or irregularly arranged, forming a more or less flat slope, called rubblemound breakwaters or simply breakwaters.

Functionally speaking, both types of conventional reflecting and rubblemound breakwaters, may be classed, in turn, into nonoverflowable and overflowable.

The basic disadvantage of conventional nonoverflowable breakwaters, whether reflecting or rubblemound, has always been their huge height, since their crown level in both cases has to exceed a height such that it prevents the highest waves in maximum storms occurring during the foreseeable life of the structure to overflow, which has led to colossal constructions, with truly impressive crown levels: San Ciprian (Lugo, Spain), 22 metres, Bilbao, 21.5 metres, Gijón, 18 metres.

To rectify the many disadvantages of such exaggeratedly high structures as far as possible, the crown level in what are called conventional, partially overflowable breakwaters has been brought down to a height almost half that of conventional nonoverflowable breakwaters. Nevertheless, this reduction, which has not sufficed to prevent the serious environmental and panoramic disadvantages of nonoverflowable breakwaters, allows overflow water and spindrift to pass which, even with small volumes of water, and consequently, unable to renew the water in sheltered areas, are capable of causing heavy damage in quays, in small boats (like sport and fishing vessels) and in port facilities in the vicinity of breakwaters.

The modest protection afforded by coverings such as slabs and pavings does not suffice to guarantee the protection of conventional overflowable breakwater crowns which causes quay walls attached to them to overturn. Examples of stability failure for this reason are very numerous and, on occasions, dramatic.

Moreover, in partially overflowable, rubblemound breakwaters without crown protection (groynes), the blocks of the main protective layer, subjected to a descending flow of water, are under highly precarious stability conditions, unless the crown width is dimensioned overlong, which means serious disadvantages as regards occupation, aesthetics, economics, etc.

Berthing quays have been traditionally built with walls, sheet-piling, etc. with vertical or quasi vertical, highly reflecting face walls for short period gravity waves.

More recently, following the traditions of southeast Asia, berthing structures have been designed with permanent piers forming open structures supported by piers and/or piles, and by floating piers, moored and/or anchored which, in both cases, do not form any appreciable hydrodynamic barrier to the propagation of currents and/or gravity waves in the sheltered areas.

Thus, with the exception of piers and the actual berthed and/or anchored boats themselves, whose presence does not substantially affect the hydrodynamics of the areas sheltered, as we have said, all these conventional marine structures, breakwaters and quays, are in fact: continuous, reflecting, impermeable and nonoverflowable, since the volume of liquid entering into the sheltered areas is practically negligible, even with conventional, partially overflowable breakwaters and despite the damage it causes.

To the environmental and panoramic problems caused by the formation of climatic and visual barriers, caused by the huge height of breakwater crowns, is added the choppiness caused by the reflection of gravity waves which enter through the harbour mouth and/or are generated by boats travelling in the sheltered areas and producing multiple interferences and possible resonances.

All these problems, together with the stagnation of water in dock basins due to the difficulty in renewing such water, with an accumulation of waste, creation of anearobic conditions, etc. are the cause of the vile environmental, health and even aesthetic quality of conventional harbours.

Applying the applicant's Spanish patents: "Energy-dissipating overflow-type protecting system on dykes and/or jetties". no. 543,747 and "Stepped mosaic breakwaters" no. 537,141 and the related Spanish Utility Models nos. 289, 904; 291,366; 295,249 and 295,248 (applicant's U.S. Pat. Nos. 4,834,578; 4,801,220; 4,875,804) enables the functional, environmental and panoramic disadvantages of conventional breakwaters to be eliminated, but only with significant design wave heights less than about four metres. When the significant design wave height is higher than that figure, the choppiness in the sheltered area becomes unacceptable for berthing small boats which are those generally frequenting marinas and fishing ports.

SUMMARY OF THE INVENTION

In contrast to the concept of the maritime shelter structure prevalent up to now, which consists of a single breakwater. —whether conventional (with huge size and crown height) or energy-dissipating overflowable (with low crown height but with a limited field of application)—the INTEGRATED. MULTIPHASE, ENERGY-DISSIPATING ENVIRONMENTAL SYSTEM introduces the concept of "shelter system" in Maritime Construction Technology, which means an authentic revolution in the manner of approaching this problem.

With the sequential, INTEGRATED, MULTIPHASE, ENERGY-DISSIPATING ENVIRONMENTAL SYSTEM, which is the subject of this Patent of Invention, the sheltered areas of water (channels and basins) form an integrated, hydrodynamic unit dissipating the energy of short period gravity waves (wind waves, wake waves, percussion waves, etc.), since this unit is limited, shaped, by a "shelter system" made up of an aggregate of structures formed by the combination, if necessary with repetition, of linear structuring elements (structures) of the following three types:

Overflowable, of very low crown height, preferably formed by overflowable shelter breakwaters, preferably rubblemound breakwaters.

Permeable, of low crown height, preferably made up of permeable quays.

Actually nonreflecting with a crown height preferably no higher than that of the land forming the shore, preferably made up of shoreline constructions forming the land/sea boundary.

Under normal conditions, overflowable structuring elements are preferably located on the sea side to break and/or reflect the waves and are preferably formed with shelter breakwaters with a low crown height, preferably breakwaters of either natural and/or artificial rubblemound in general, with the crown even totally or partially submerged and thus being overflowable by waves as required.

This low crown level of the overflowable structuring elements facilitates the entry of water flows caused by breaking waves into the sheltered area, improving the renewal of water in these areas and allowing these flows, if such be the case, to return at least partially to the sea, but to do so, the crown of these overflowable elements must be suitably shaped, dimensioned and protected in order to guarantee stability.

Applying the applicant's Spanish patents: "Energy-dissipating overflow-type protection system on dykes and/or jetties", no. 543,747 and "Stepped mosaic break-waters", no. 537,141 and the related Spanish Utility Models nos. 289,904; 291,366; 295,249 and 295,248 (applicant's U.S. Pat. Nos. 4,834,578; 4,801,220; 4,875,804) enables the crown of these overflowable structuring elements to be provided with suitable flat tops, preferably fitted with devices and/or shapes in high and/or bass relief, which facilitates the aeration of the liquid flux and the dispersion of the overflow waters into the air, extending the impact period and area with which the effectiveness of these overflowable elements as energy dissipators is increased.

In addition, the possible solutions afforded by applying these patents and utility models improve the features of the System's overflowable structuring element occupation. enable the size and cost of the construction work to be reduced and make it possible to simulate natural geological outcrops: basaltic, granitic, etc., with the consequent functional, environmental, panoramic, scenic and economic advantages.

In general, the permeable structuring elements are positioned as berthing quays on the shelter side of the energy-dissipating channels and in certain locations in the port basins, forming selective hydrodynamic barriers allowing currents and long period gravity waves, tides, etc. to pass through them and filtering short period gravity waves (wind waves, wake waves, percussion waves).

Applying the applicant's patent entitled "Energy-dissipating Permeable System, with laminar perforated elements", Spanish application no. P.9102080, enables these permeable structuring elements to be functionally optimized by using perforated plates with holes and/or grooves attached to the open pre-existent structures and, should such be the case, forming the permeable elements themselves with cellular caisson structures, ballasted, if necessary, with rubblemound, tubular pieces, etc. which enable maximum effectiveness of this structuring element as a selective hydrodynamic barrier to be achieved in each case. In certain cases, if convenient, thanks to this same "Energy-dissipating Permeable System, with laminar perforated elements" patent, the permeable structuring elements can be shaped as permeable-overflowable structures.

Preferably, all overflowable and/or permeable structuring elements in Integrated Environmental Systems are arranged and behave like nonreflecting elements, at least partially, but the actual nonreflecting structuring elements themselves are neither overflowable or permeable but simply nonreflecting.

These nonreflecting structuring elements have their basic application in forming the land/sea interface (dock basins, etc.), making up the boundaries of interior, nonoverflowable, impermeable structures such as shore quays, dockyards (separate or joined to land), etc.

Applying the applicant's aforementioned "Energy-dissipating Permeable System, with laminar perforated elements" patent enables the morphology and functionality of these nonreflecting structuring elements to be optimized, by preferably using cellular caisson structures with one of their panels blank, unperforated, which provides these nonreflecting elements with the necessary leak-tightness.

All the structuring elements mentioned, preferably the overflowable and permeable ones, may be discontinuous and divided into three separate stretches, with openings which, in accordance with maritime terminology we shall call mouths.

If necessary, these stretches overlap to prevent short period gravity waves being transmitted by the mouths, with overlaps preferably in continuous monotonous series, alternating series (staggered) and/or randomly.

The distances separating the adjacent stretches and the overlapping lengths between them, as well as the orientation of the mouths, have to be suitable for preventing, at least partially, any choppiness being transmitted to more sheltered areas. If necessary, these mouths may be fitted with suitable, perforated plates or other permeable devices which will filter short period gravity waves.

With the INTEGRATED ENVIRONMENTAL SYSTEM, the channel and basin unit then becomes an integrated, energy-dissipating hydrodynamic one in which overflows and, should such be the case, coastal currents enter under control, thus facilitating renewal of the water in sheltered areas. Short period gravity waves (wind waves, percussion waves, wake waves) are filtered and their reflections, interferences and possible resonances are dissipated.

Because of their particular location, there is a specific separation of the different choppiness areas: channels and basins. Choppiness in exterior channels may be relatively heavy, at least occasionally, so these channels, if necessary, may only be occupied for harbour and/or recreational purposes during times of good weather which, in our latitudes, fortunately coincide with the tourist season.

In forming sheltered areas for recreational and/or harbour uses, located on coasts with moderate energy waves, we can consider the following closed sequence as standard.

---
(sea / overflowable element / hydraulic dissipator /
/ permeable element / hydraulic dissipator /
/ nonreflecting element / land).
--- limited by land and sea, formed by the combination in series of a structuring element from each of the three types, but when waves are high energy or when other conditions so require, there are further sequences, if necessary, with repetition of some of the structuring elements, as in the following examples:

---
(sea / overflowable element / hydraulic dissipator /
/ overflowable element / hydraulic dissipator /
/ permeable element / hydraulic dissipator -
(sea / overflowable element / hydraulic dissipator /
/ permeable element / hydraulic dissipator /
/ permeable element / hydraulic dissipator -
--- and/or the multiplication of the number of structuring elements, forming integrated environmental Systems with a higher degree of sequences.

In certain cases, preferably when carrying out extensions, remodelling and/or improving already existing ports and/or basins, part of the pre-existing conventional marine structures can be used and the INTEGRATED ENVIRONMENTAL SYSTEM will be simplified, reduced, for example, to the open sequence.

---
(sea / overflowable element / hydraulic dissipator /
/ overflowable element / hydraulic dissipator -
--- and the open INTEGRATED ENVIRONMENTAL SYSTEM is supplemented with other pre-existing conventional port systems.

In such cases, it is worth remodelling the conventional port elements by reducing their crown levels to levels compatible with those of the INTEGRATED ENVIRONMENTAL SYSTEM'S structuring elements.

As we pointed out earlier, when wave features are small, with a significant design wave height of less than four metres, choppiness in the body of water (channel, basin, etc.) leeward of the external structuring element is in some cases very little, practically negligible, and the INTEGRATED ENVIRONMENTAL SYSTEM can be simplified even further, by reducing, degenerating it (in the mathematical sense) to a single structuring element. In such a case, the solution may be to directly apply one of the applicant's patents: "Energy-dissipating overflow-type protection system on dykes and/or jetties", "Stepped mosaic breakwater" and, even, when fitting, the ", Energy-dissipating Permeable System, with laminar perforated elements".

As we already indicated, with the INTEGRATED, MULTIPHASE, ENERGY-DISSIPATING ENVIRONMENTAL SYSTEM, the concept of a shelter system is introduced in contrast to the concept of the simple, single, shelter structure, prevalent up to now, which means a new way of approaching the shelter problem, both for new designs and for the extension, remodelling and restoring of pre-existing structures.

Among the numerous advantages of the INTEGRATED ENVIRONMENTAL SYSTEM, we shall only point out those enabling us to evaluate the great technical attraction and novelty of this invention as indicated:

However high the design wave height is, it is possible to obtain a multiphase, short period gravity wave energy-dissipating INTEGRATED ENVIRONMENTAL SYSTEM, whose crown height can be low as required and in no case exceeds much more than one meter above sea level, which allows for the free circulation of surface air and preservation of sea views, with no other barriers than those created by nature herself.

These climatic and panoramic advantages are particularly appreciated at the present time both by coast dwellers and visitors since both the sea views and presence of breezes characterize the highly appreciated excellencies of the coastline and are essential reasons for its charm. These advantages are particularly appreciable in urban areas where the use of conventional breakwaters with crown heights generally above eight metres, and which can occasionally exceed twenty, can affect shoreline residents and users.

A very important additional advantage of the INTEGRATED ENVIRONMENTAL SYSTEM which is the subject of this invention, is its ease as regards user occupation, both the structuring elements themselves (by strollers, bathers, anglers) and the energy-dissipating channel or channels (for the occasional berthing of boats). This possibility for occupying the channel or channels in the INTEGRATED ENVIRONMENTAL SYSTEM has significant functional and economic importance, since it enables occasional mooring to be provided for small craft which do not avail of a permanent berth, cruise boats, etc.

However small the tidal range, even if nil, as in the Mediterranean, with the INTEGRATED ENVIRONMENTAL SYSTEM, it is possible to renew the dock basin water, due to the combined effect of overflow and permeability characterizing the INTEGRATED ENVIRONMENTAL SYSTEM, which prevents mud sedimentation problems, floating item accumulation and the establishment of anaerobic conditions, so frequent and undesirable both from the health and aesthetic point of view in conventional systems.

When geographical and cultural environments are suitable, the use of discontinuous structuring elements with stretches separated by mouths enables coastal areas to be sheltered with a group of structures (stretches) which simulate, if necessary, geographical compositions such as chains of islands, archipelagos, atolls, etc. which is a most outstanding advantage from the environmental and landscape point of view.

By applying the applicant's aforementioned patents "Energy-dissipating overflow-type protection system on dykes and/or jetties", "Stepped mosaic breakwaters" and "Energy-dissipating Permeable System, with laminar perforated elements" and their related Utility Models, the INTEGRATED ENVIRONMENTAL SYSTEM, built as per this invention, can adopt layouts and morphologies enabling its effectiveness as an energy dissipator to be optimized and geomorphological (dunes, cliffs) and/or geological reliefs (column basalts, granites) to be simulated, which means a great advantage and important supplement for the aforementioned geographical simulation.

The field of application for structures built with the INTEGRATED ENVIRONMENTAL SYSTEM is very broad and varied, with new, diverse functions and layouts not only in newly designed structures but also in the extension, remodelling and restoration of already existing marine structures.

In short, it is necessary to underline that shelter effects, shoreline defence, etc., equivalent to those achieved with conventional, nonoverflowable breakwaters, whether rubblemound or vertical, with huge crown heights and sizes, can be obtained with structures which hardly emerge and are even partially submerged, overflowable and/or permeable, nonreflecting and, should such be the case, discontinuous, like those specific to this INTEGRATED ENVIRONMENTAL SYSTEM, while at the same time improving functional, occupational, health, panoramic, landscape, aesthetic and financial conditions.

The definition of the INTEGRATED ENVIRONMENTAL SYSTEM can also be deduced from analysing the accompanying clarifying figures, with a nonlimiting definition of the subject of this invention.

BRIEF DESCRIPTION OF THE DRAWING

FIGS. 6–9 are each a fragmentary isometric schematic of a respective open variation;

FIGS. 12–15 are each a fragmentary side elevational schematic of an embodiment eliminating one of the structuring elements; and FIGS. 16–19 are each a plan view schematic layout of a respective embodiment of the present invention.

DETAILED DESCRIPTION OF THE PREFERRED EMBODIMENTS

Figure 1:
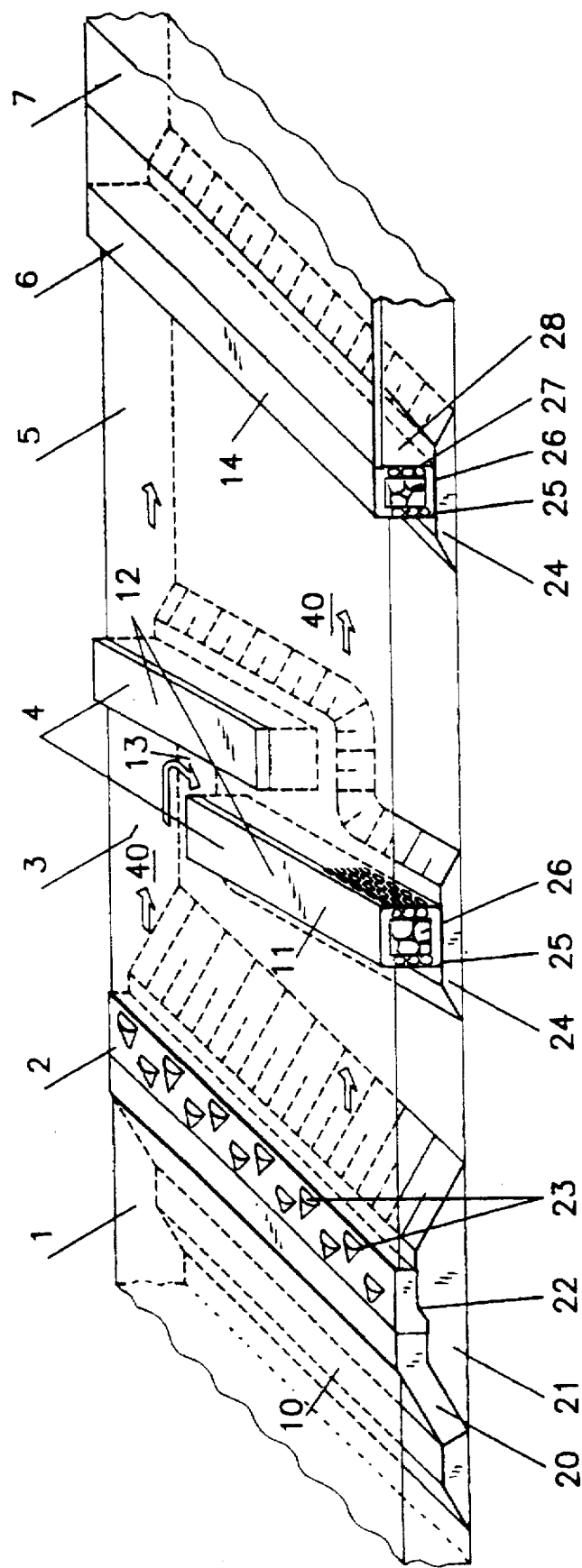
FIGS. 1–3 are each a fragmentary isometric schematic of a respective preferred embodiment of the present invention.
Figure 2:
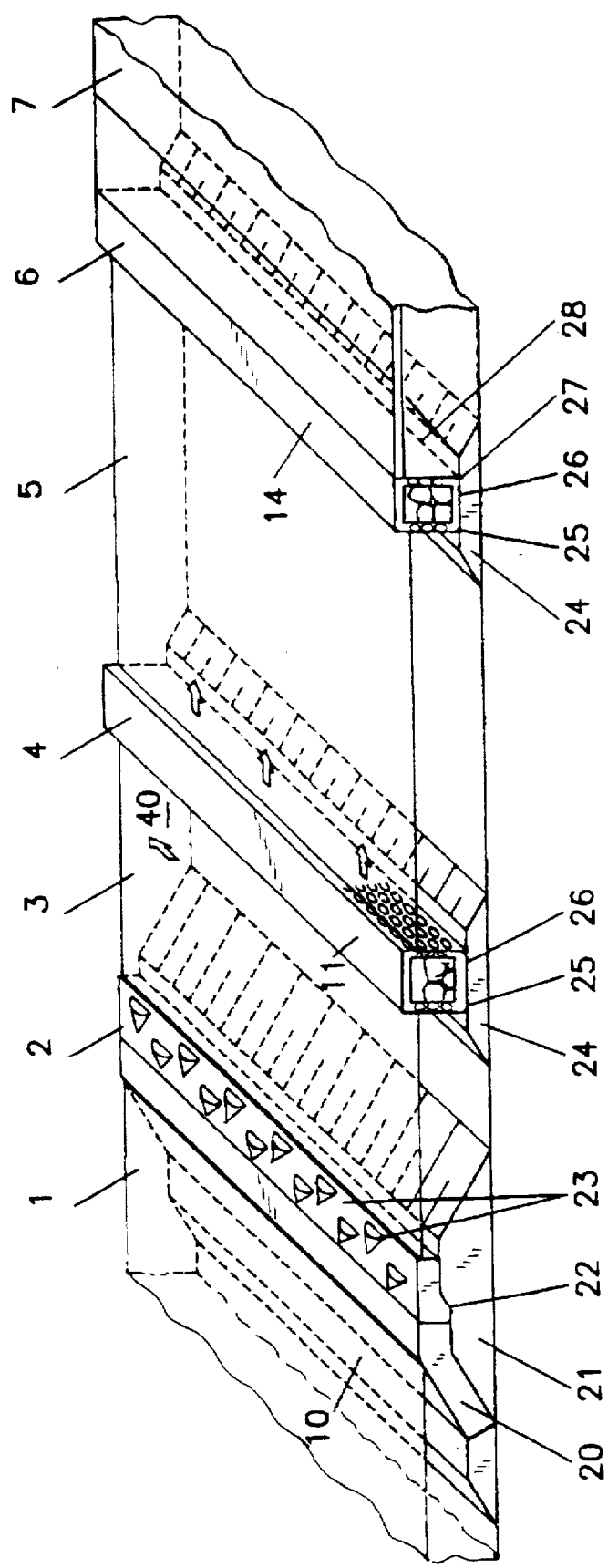
Figure 3:
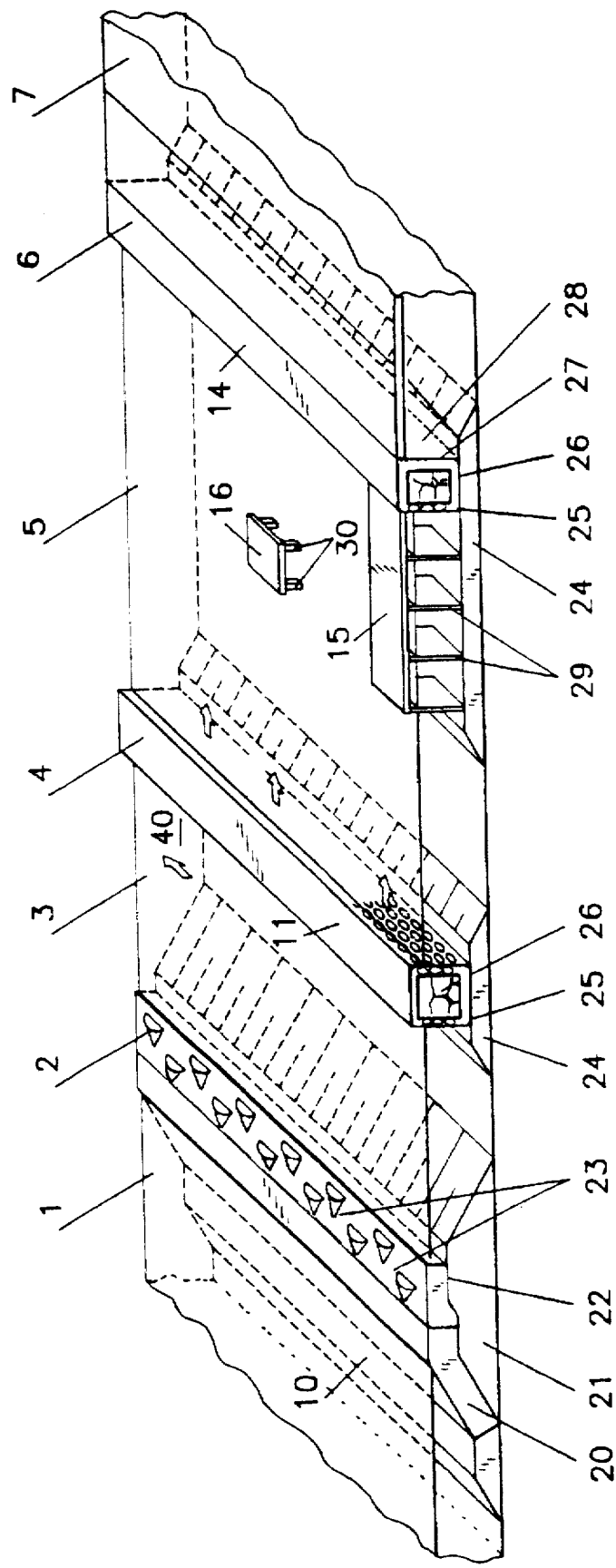

FIGS. 1, 2 and 3 show three applications of the INTEGRATED ENVIRONMENTAL SYSTEM in perspective, configured as a standard shelter system with the combination in order, without repetition, of the structuring elements from the three types and the following closed sequence, (sea / overflowable element/ hydraulic dissipator /
/ permeable element / hydraulic dissipator /
/ nonreflecting element / land).

bound by land and sea, where the first hydraulic dissipator acts as a channel with occasional berths useable in season and the second as a dock basin with permanent berths. All the structuring elements in FIGS. 1, 2 and 3 are linear and continuous, except the permeable structuring element in FIG. 1 which is discontinuous.

In the three FIGS. 1 to 3, and the following ones, when pertinent, the body of water is indicated with a 1 (sea, lake, reservoir, etc.); an overflowable structuring element with a 2 (in this application, formed with the applicant's "Energy-dissipating overflow-type protection system on dykes and/or jetties" patent, with the layout of an overflowable, energy-dissipating rubblemound breakwater, 10); a first hydraulic energy dissipator, acting as a energy-dissipating channel, with 3; a permeable structuring element, with 4 (in this application, formed with the applicant's "Energy-dissipating Permeable System, with perforated laminar elements" patent, with application number P.9102080, with the layout of a caisson filter quay, 11); a second hydraulic dissipator (acting as a port, recreational basin, etc.) with 5; a nonreflecting element (in this application, schematized with a caisson filter dock, 14, with the blank land side plate, 27) with 6 and terra firma, the shore, (in this application with a function as a possible service area) with 7.

In the application of FIG. 1, the permeable structuring element, 4, is discontinuous, with its stretches indicated by 12 and the discontinuities, i.e., the spaces between adjacent stretches, which using maritime terminology, we here call mouths, with a 13.

In these FIGS. 1, 2 and 3 and in the following ones, when fitting, the main protection layer of the overflowable, rubblemound, energy-dissipating breakwater, 10 is shown by 20; the secondary layer and core of this breakwater by 21; the flat crown top with 22 and the high relief, energy-dissipating elements with 23. The foundation berm of the caisson filter quay, 11, with 24 and the perforations in the lateral plates and caisson stabilizing boulders with 25 and 26 respectively.

The same 24, 25 and 26 respectively identify the foundation berm, perforation of lateral division walls and stabilizing boulders of the blank caisson filter dock, 14, which, in this application, becomes an actual nonreflecting structuring element itself, neither overflowable nor permeable, which we have already shown with a 6. The blank plate of the caisson filter dock, 14, which acts as a shore quay and is located or sited at the land limit, 7, is shown with a 27. The landward side of this nonreflecting element is occupied by a gravel fill, shown by 28.

The arrows which schematize the most frequent direction of the hydrodynamic circulation, over the overflowable sea wall, via percolation through the permeable elements and via the mouths, 13, allowing the water in sheltered areas, channels and dock basins, to be renewed, are indicated by 40.

FIG. 3 shows the application of the layouts of the two open, nonstructuring elements most common in coastal and harbour complexes: A pier, 15, supported on piers, 29, and a platform, 16, supported on piles, 30, whose presence does not substantially affect either the hydrodynamic integrity or hydrodynamic configuration of the System, but which facilitate better recreational operation and use of the INTEGRATED ENVIRONMENTAL SYSTEM.

Figure 4:
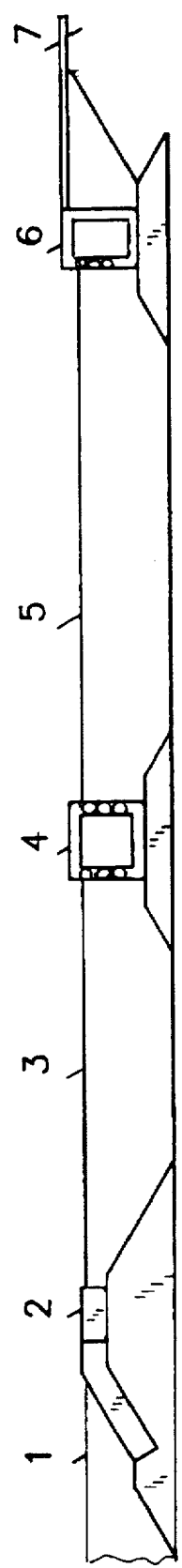
FIGS. 4–5 are each a fragmentary isometric schematic of a respective closed variation.
Figure 5:
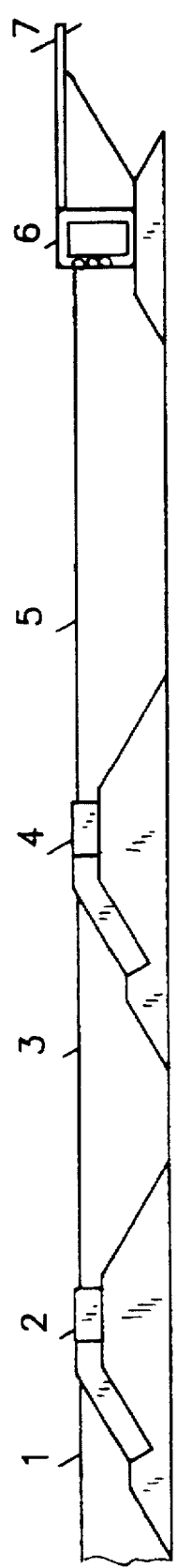
Figure 8:
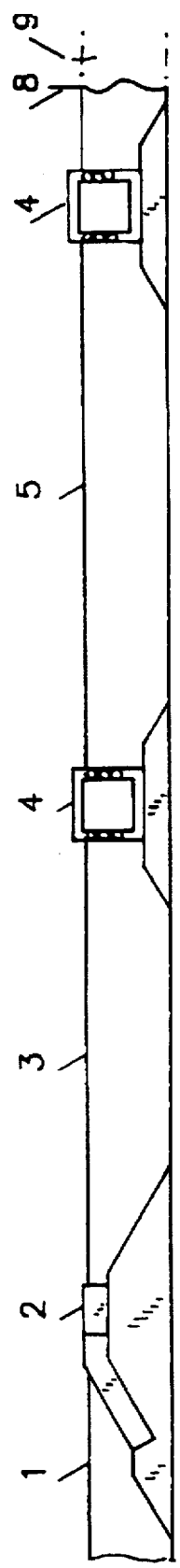
Figure 9:
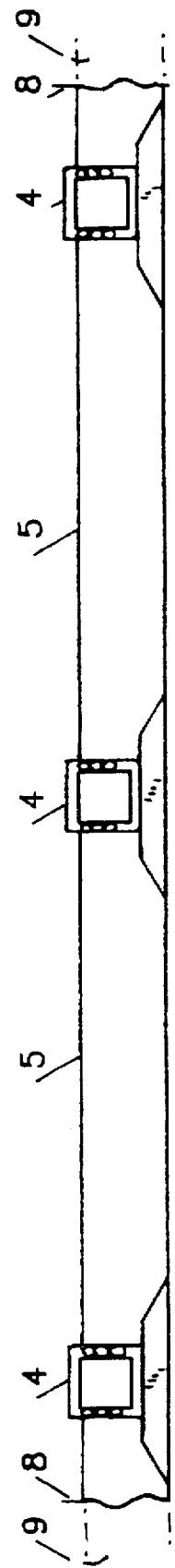

As a nonexhaustive indication, in FIGS. 4 to 9, the layouts of the cross sections of some applications for the INTEGRATED ENVIRONMENTAL SYSTEM are shown, forming a short synoptic summary of some possible structuring sequences:

figure 4
(sea / overflowable element / hydraulic dissipator /
/ permeable element / hydraulic dissipator /
/ nonreflecting element / land)

figure 5
(sea / overflowable element / hydraulic dissipator /
/ overflowable element / hydraulic dissipator /
/ nonreflecting element / land)

figure 6
- hydraulic dissipator /
/ permeable element / hydraulic dissipator /
/ permeable element / hydraulic dissipator /
/ nonreflecting element / land)

figure 7
(sea / overflowable element / hydraulic dissipator /
/ overflowable element / hydraulic dissipator /
/ permeable element - figure 8
(sea / overflowable element /hydraulic dissipator /
/ permeable element / hydraulic dissipator /
/ permeable element - figure 9
- hydraulic dissipator /
/ permeable element / hydraulic dissipator /
/ permeable element / hydraulic dissipator /
/ permeable element -

In the case of FIG. 4, an application is shown with only one structuring element from each of the three types in the INTEGRATED ENVIRONMENTAL SYSTEM, without repetition, forming a closed sequence, bounded by land and sea. This sequence may be considered as standard as it contains the three types of structuring elements without repetition and in the most frequent order in practical applications. This standard sequence is identical to those represented in FIGS. 1, 2 and 3 and is included in this summary only for synoptical reasons.

Two applications are shown in FIGS. 5 and 6, with repetition of the overflowable structuring elements, 2, in FIG. 5 and permeable, 4, in FIG. 6, with closed sequences.

Four applications are shown in FIGS. 6 to 9, with repetition of one of the structuring elements, with open, unlimited sequences, at one of their ends: In the system shown in FIG. 6, on its sea side; in the systems shown in FIGS. 7 and 8, on their land side. In the application shown in FIG. 9, the sequence is unlimited at both ends, land and sea.

In these figures, 8 indicates the limit of the representation of the INTEGRATED ENVIRONMENTAL SYSTEM and 9, the possible extra elements, alien to the INTEGRATED ENVIRONMENTAL SYSTEM. These extra elements, 9, may be additional structuring elements from any of the three types considered, with the whole then making up an INTEGRATED ENVIRONMENTAL SYSTEM, with a sequence of a higher degree than those sequences already considered, or may be nonoverflowable, impermeable and/or reflecting elements of a conventional system to which are added an open sequence INTEGRATED ENVIRONMENTAL SYSTEM by an extension, remodelling, etc.

In the same way as there is a possibility of sequences with a degree of complexity higher than the third, it is also possible, of course, to simplify the INTEGRATED ENVIRONMENTAL SYSTEM by eliminating one or some of the structuring elements.

Figure 10:
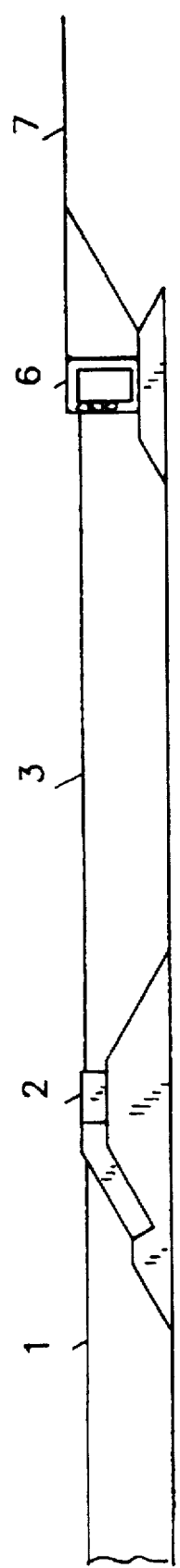
FIG. 10 is a fragmentary side elevational schematic of an embodiment without a permeable structuring element.
Figure 11:
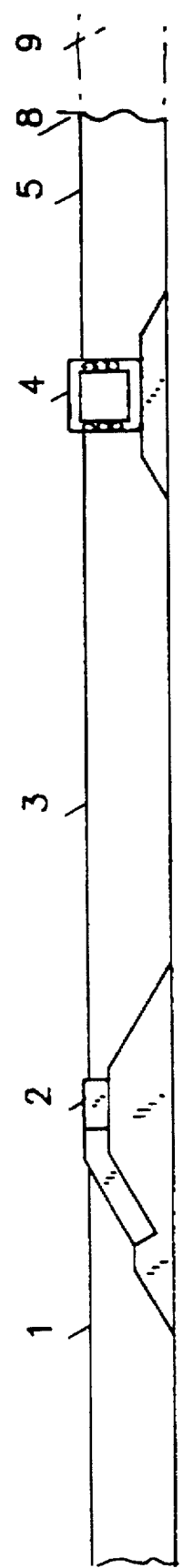
FIG. 11 is a fragmentary side elevational schematic of an embodiment without a non-reflecting structuring element.

In this context, FIGS. 10 and 11 show two applications with elimination of the permeable structuring element in the first, FIG. 10, and of the nonreflecting structuring element, FIG. 11.

The application in FIG. 10 is especially suited to shoreline protection while that in FIG. 11 constitutes the standard, reduced form of the INTEGRATED ENVIRONMENTAL SYSTEM, with an open sequence, applicable in the extension, remodelling and/or improvement of already existing harbour and/or costal complexes and to the protection and/or sheltering of new conventional projects with elements, should such be the case, either impermeable and/or reflecting in nature in which the condition of low crown height is imposed.

Obviously, the structuring elements of the INTEGRATED ENVIRONMENTAL SYSTEM may be shaped with any type of construction, provided they comply with specifications, low crown level, etc., characterizing this System.

In order not to overwhelm with a number of examples with possible types other than those represented in the applications shown in FIGS. 1 to 11, only some applications will be shown hereafter with reduced sequences, with only two structuring elements, and only some of the most usual conventional types are used.

An application of the INTEGRATED ENVIRONMENTAL SYSTEM with an open sequence is shown in FIG. 12

(sea / overflowable element / hydraulic dissipator /
/permeable element - identical to that shown in the application in FIG. 11, but with its overflowable structuring element, 2, formed here with breakwaters (groynes) without a flat crown top. The main protection layer in this application covers the breakwater crown, 31, in its entirety, which, if the crown height is low, compels a very wide width for this crown. In this case, it is not recommended to use the outside shore, on the sea side, for recreational purposes.

FIG. 13 shows an application for the INTEGRATED ENVIRONMENTAL SYSTEM with an open sequence (sea / overflowable element / hydraulic dissipator /
/ overflowable element - whose second overflowable structuring element is formed with a vertical, low crown height breakwater, 18, whose body, 32, rests on a berm, 24, and is protected with the pertinent guard blocks, 33. With this arrangement, the vertical breakwater, 18, may be used, at least seasonally, as a breakwater-quay.

In order to remove the water flowing over the first overflowable element, 2, the vertical breakwater, 18, must preferably be discontinuous, with its pertinent mouths.

FIG. 14 shows an application with the same sequence as the foregoing application, (sea / overflowable element / hydraulic dissipator /
/ overflowable element - but with its two overflowable structuring elements, 2, formed with the applicant's "Stepped mosaic system", Spanish patent no. 537,141 and Spanish utility models nos. 289,904; 291,366 and 259,249 (applicant's U.S. Pat. Nos. 4,801,220; 4,875,804) which enable the crown of both overflowable structuring elements, 19, to be configured as energy dissipators, while simulating basaltic, granitic and terrace type landscapes, which improves their functional, occupational, environmental, aesthetic and landscape quality.

FIG. 15 shows an application of the INTEGRATED ENVIRONMENTAL SYSTEM with a closed sequence (sea / overflowable element / hydraulic dissipator / / nonreflecting element / land)

identical to that of the application in FIG. 10 but with its nonreflecting structuring element, 6, formed by an unobstructed quay, 34, on piles, 35, with a rockfill ramp, 36, to prevent short period gravity wave reflection (wind waves, wake waves, percussion waves).

It is thus possible to configure the INTEGRATED ENVIRONMENTAL SYSTEM with numerous sequences and varying types of structuring element arrangements, achieving applications suited to the different functions, uses and configurations of coastal complexes. To this effect, it would seem advisable to graphically illustrate the use of discontinuous elements with overlapping, nondiffracting stretches, helping in the rapid removal of overflow water and facilitating the renewal of water in sheltered areas, with some examples.

FIGS. 16 and 17 show layouts in ground plan of two applications of the INTEGRATED ENVIRONMENTAL SYSTEM, the first, FIG. 16, with its permeable structuring elements, 4, discontinuous, in alternating series, staggered, and the second in a continuous monotonous series, FIG. 17. The overflowable structuring element in FIG. 18 is discontinuous and in FIG. 19 both structuring elements are discontinuous.

In any event, the direction of the stretches, 12, of the different structuring elements must be orientated with respect to the direction of wave propagation, shown with the arrow, 37. The layout of diffraction in the mouths, 13, is shown schematically with a wave crest, 38.

I claim:

1. An integrated, multiphase, energy-dissipating environmental system comprising:

spaced apart pair of separate low crown level stretches (2, 4) generally parallel to each other and to a coast, the seaward stretch being an overflowable breakwater structural element (10) and the landward stretch being a permeable quay or dock structural element (11); and (B) intermediate said spaced apart pair of stretches, a navigable stilling channel acting as a hydrodynamic dissipator (3).

2. The system of claim 1 wherein said overflowable element is a shelter or rubblemound breakwater.

3. The system of claim 1 wherein said permeable element is a quay.

4. The system of claim 1 wherein at least one of said stretches is discontinuous with a pair of adjacent portions thereof defining a separating mouth.

5. The system of claim 4 wherein said pair of overlap.

* * * * *